US012802449B2

(12) United States Patent
Neill et al.

(10) Patent No.: US 12,802,449 B2

(45) Date of Patent: Nov. 17, 2026

(54) SMART PRIVACY ZONES

(71) Applicant: Tyco Fire & Security GmbH, Neuhausen am Rheinfall (CH)

(72) Inventors: Terence Neill, Lisburn (GB); Christopher Raymond Irvine, Craigavon (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 36 days.

(21) Appl. No.: 18/521,889

(22) Filed: Nov. 28, 2023

(65) Prior Publication Data

US 2025/0174023 A1 May 29, 2025

(51) Int. Cl.

| | |
|---|---|
| ***G06V 20/05*** | (2022.01) |
| ***G06T 7/12*** | (2017.01) |
| ***G06T 7/50*** | (2017.01) |
| ***G06T 7/62*** | (2017.01) |
| ***G06T 7/70*** | (2017.01) |
| ***G06V 10/764*** | (2022.01) |
| ***G06V 20/52*** | (2022.01) |
| ***H04N 21/431*** | (2011.01) |

(52) U.S. Cl.

CPC ................ *G06V 20/52* (2022.01); *G06T 7/12* (2017.01); *G06T 7/50* (2017.01); *G06T 7/62* (2017.01); *G06T 7/70* (2017.01); *G06V 10/764* (2022.01); *H04N 21/4318* (2013.01)

(58) Field of Classification Search

None

See application file for complete search history.

(56) References Cited

U.S. PATENT DOCUMENTS

| | | | |
|---|---|---|---|
| 6,509,926 | B1 | 1/2003 | Mills et al. |
| 7,307,652 | B2 | 12/2007 | Broemmelsiek |
| 8,194,127 | B2 | 6/2012 | Kang et al. |
| 8,212,872 | B2 | 7/2012 | Sablak |
| 8,558,892 | B2 | 10/2013 | Brodsky et al. |
| 8,576,282 | B2 | 11/2013 | Salgar et al. |
| 9,058,523 | B2 | 6/2015 | Merkel et al. |
| 9,319,635 | B2 | 4/2016 | Huang et al. |
| 9,602,778 | B2 | 3/2017 | Ristivojevic et al. |
| 9,648,285 | B2 | 5/2017 | Traff et al. |
| 9,794,518 | B2 | 10/2017 | Barcala |
| 9,875,530 | B2 | 1/2018 | Gustav |
| 10,297,126 | B2 | 5/2019 | Rao |
| 10,318,836 | B2 | 6/2019 | Burke et al. |
| 10,475,191 | B2 | 11/2019 | Gottumukkal et al. |

(Continued)

FOREIGN PATENT DOCUMENTS

| | | |
|---|---|---|
| CN | 105791751 B | 5/2019 |
| CN | 112037127 A | 12/2020 |

(Continued)

*Primary Examiner* — Samira Monshi

(74) *Attorney, Agent, or Firm* — ArentFox Schiff LLP

(57) ABSTRACT

Example aspects include techniques for implementing a smart privacy zone. These techniques may include tracking an object within initial video capture information. In addition, the techniques may include determining that the object is not within a privacy zone based upon a depth of the privacy zone. Further, the techniques may include generating final video capture information that does not apply a mask to at least a portion of the object based on the object not being within the privacy zone.

27 Claims, 6 Drawing Sheets

(56) References Cited

U.S. PATENT DOCUMENTS

| | | | |
|---|---|---|---|
| 10,701,321 | B2 | 6/2020 | Westmacott et al. |
| 10,841,642 | B2 | 11/2020 | Altuev |
| 10,915,660 | B2 | 2/2021 | Matusek et al. |
| 11,030,464 | B2 | 6/2021 | Ito |
| 11,049,377 | B2 | 6/2021 | Langhammer et al. |
| 11,145,151 | B2 | 10/2021 | Gallagher et al. |
| 11,200,767 | B2 | 12/2021 | Boyes et al. |
| 11,457,183 | B2 | 9/2022 | Trundle et al. |
| 11,470,285 | B2 | 10/2022 | Westmacott et al. |
| 11,615,620 | B2 | 3/2023 | Adam |
| 11,688,219 | B2 | 6/2023 | Martin et al. |
| 11,696,024 | B2 | 7/2023 | Calvert et al. |
| 11,748,926 | B2 | 9/2023 | Choi et al. |
| 11,749,038 | B2 | 9/2023 | Neill et al. |
| 11,763,662 | B2 | 9/2023 | Neill et al. |
| 11,869,239 | B2 | 1/2024 | Calvert et al. |
| 12,307,813 | B2 | 5/2025 | Neill et al. |
| 12,309,522 | B2 | 5/2025 | Hassbring et al. |
| 12,407,916 | B2 | 9/2025 | Lawrence et al. |
| 2006/0187237 | A1 | 8/2006 | Park |
| 2008/0252723 | A1 | 10/2008 | Park |
| 2014/0176663 | A1* | 6/2014 | Cutler .................. H04N 23/951 348/14.07 |
| 2017/0200044 | A1 | 7/2017 | Lee et al. |
| 2020/0285840 | A1 | 9/2020 | Neill et al. |
| 2020/0293767 | A1* | 9/2020 | Choi ...................... G06V 20/52 |
| 2021/0209877 | A1 | 7/2021 | Neill et al. |
| 2021/0327186 | A1 | 10/2021 | Martin et al. |
| 2022/0058393 | A1 | 2/2022 | Calvert et al. |
| 2022/0060624 | A1 | 2/2022 | Calvert et al. |
| 2022/0269878 | A1 | 8/2022 | Neill et al. |
| 2022/0309904 | A1 | 9/2022 | Neill et al. |
| 2023/0050055 | A1 | 2/2023 | Houston et al. |
| 2023/0108667 | A1 | 4/2023 | Hassbring et al. |
| 2024/0161443 | A1* | 5/2024 | Okuike ............... G06F 21/6245 |
| 2025/0037557 | A1 | 1/2025 | Sundell et al. |
| 2025/0131538 | A1 | 4/2025 | Attebo |
| 2025/0182488 | A1* | 6/2025 | An ......................... G06V 20/52 |
| 2025/0292605 | A1 | 9/2025 | Fee et al. |
| 2025/0310630 | A1 | 10/2025 | Lawrence et al. |

FOREIGN PATENT DOCUMENTS

| | | | |
|---|---|---|---|
| CN | 111866600 | B | 10/2021 |
| CN | 114025173 | A | 2/2022 |
| CN | 114827549 | A | 7/2022 |
| CN | 115379260 | B | 11/2023 |
| CN | 112037127 | B | 8/2024 |
| CN | 120455756 | A | 8/2025 |
| DE | 10158990 | C1 | 4/2003 |
| EP | 1262072 | B1 | 4/2004 |
| EP | 3796655 | A1 | 3/2021 |
| EP | 3910539 | A1 | 11/2021 |
| EP | 4407569 | A1 | 7/2024 |
| JP | 2007-243509 | A | 9/2007 |
| JP | 2016-201720 | A | 12/2016 |
| WO | 2004/045215 | A1 | 5/2004 |
| WO | 2005/026907 | A2 | 3/2005 |
| WO | 2023/141381 | A1 | 7/2023 |
| WO | 2024/137172 | A1 | 6/2024 |

* cited by examiner

SMART PRIVACY ZONES

BACKGROUND

Privacy zones safeguard sensitive information captured by video surveillance systems. Privacy zones serve as a virtual barrier, obscuring specific areas within the camera's field of view, such as ATM keypads and screens, windows into private spaces, and other confidential areas. By implementing privacy zones, organizations can ensure that critical information remains secure and inaccessible to unauthorized individuals, while still maintaining a comprehensive surveillance system for overall safety and security purposes. However, when privacy zones are drawn on a video capture image (e.g., CCTV image), there is no concept of depth associated with them. As a result, a privacy zone can unintentionally obscure important video image data related to objects close to the camera. The lack of depth perception in the implementation of privacy zones can result in the inadvertent masking of crucial information, potentially compromising the effectiveness of the surveillance system and the overall security measures in place.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method including: tracking an object within initial video capture information; determining that the object is not within a privacy zone based upon a depth of the privacy zone; and generating final video capture information that does not apply a mask to at least a portion of the object based on the object not being within the privacy zone.

In some aspects, the techniques described herein relate to a system for managing privacy zones in video surveillance, including: one or more memories storing instructions; and one or more processors communicatively coupled with the one or more memories and configured to execute the instructions to: track an object within initial video capture information; determine that the object is not within a privacy zone based upon a depth of the privacy zone; and generate final video capture information that does not apply a mask to at least a portion of the object based on the object not being within the privacy zone.

In some aspects, the techniques described herein relate to a non-transitory computer-readable device storing instructions thereon that, when executed by at least one computing device, causes the at least one computing device to perform operations including: tracking an object within initial video capture information; determining that the object is not within a privacy zone based upon a depth of the privacy zone; and generating final video capture information that does not apply a mask to at least a portion of the object based on the object not being within the privacy zone.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
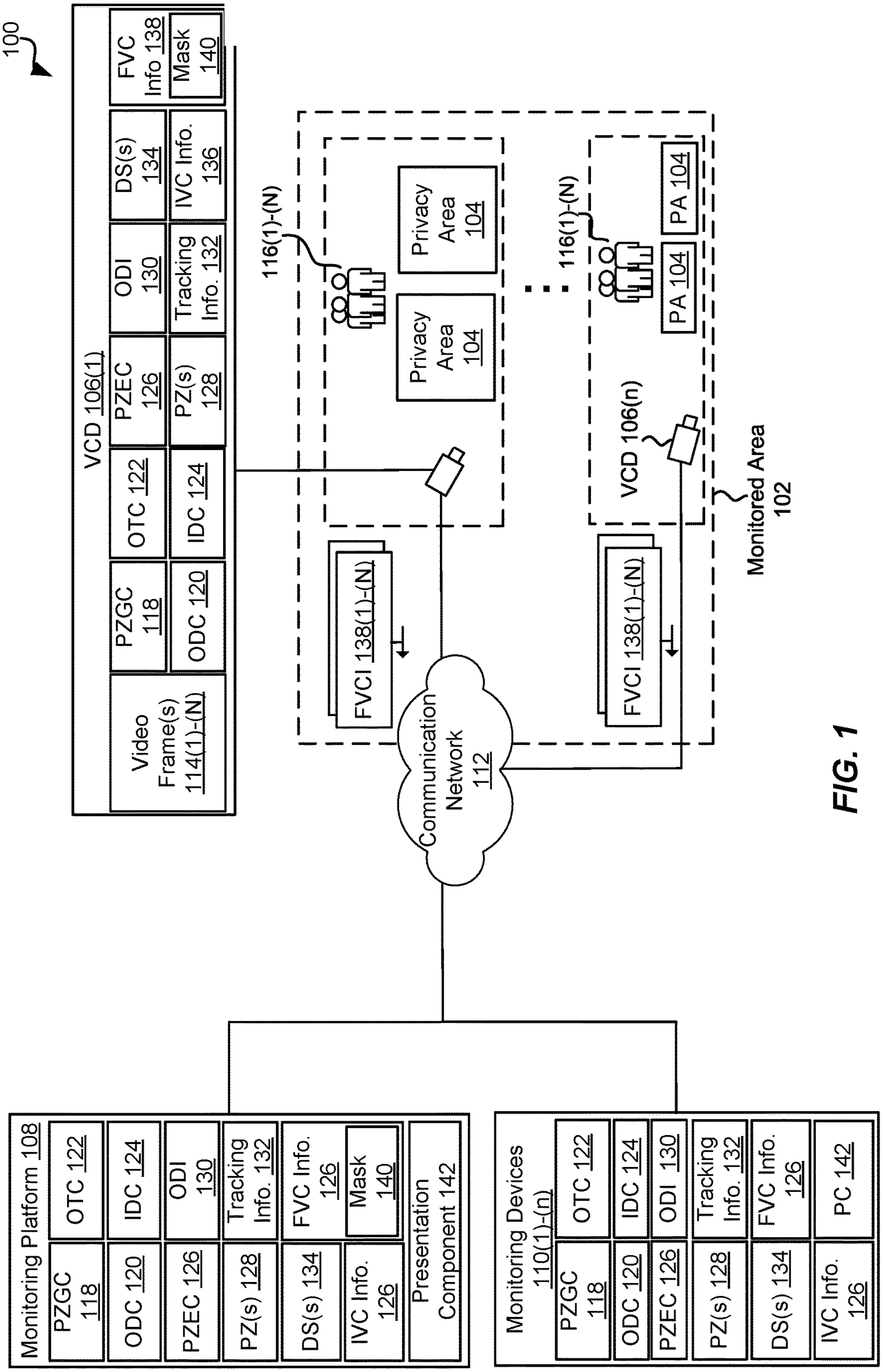
FIG. 1 illustrates an example architecture of a computing system implementing unified query optimization for scale-out query processing, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Implementations of the present disclosure provide systems, methods, and apparatuses that implement smart privacy zones. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

This disclosure describes techniques for implementing smart privacy zones. Traditional privacy zones drawn on video capture images do not account for depth, which can lead to unintentional obscuring of crucial video data related to objects near the camera. This lack of depth perception in privacy zones can result in the inadvertent masking of essential information, potentially reducing the effectiveness of the surveillance system and/or compromising overall security measures. Aspects of the present disclosure incorporate depth information into privacy zones by allowing users to specify a distance from the camera at which the privacy zone should be applied. In particular, objects may be tracked across a plurality of video frames captured by a video capture device (e.g., a camera). In addition, when a tracked object intersects with a smart privacy zone, the system determines whether the object is closer to or further away from the video capture device than the configured privacy zone distance. If the object is closer, the object may be visible on top of the smart privacy zone. If the object is further away or at a depth equal to the smart privacy zone, the smart privacy zone masks the object. This dynamic updating of smart privacy zones, based on the tracked object and depth information, offers an enhanced surveillance solution that ensures critical information remains protected without compromising the visibility of important objects in the camera's field of view.

Referring to FIG. 1, in one non-limiting aspect, a system 100 may be configured to implement a smart privacy zone within surveillance information of a monitored area 102. As illustrated in FIG. 1, the monitored area 102 may include a plurality of privacy areas 104(1)-(N). Further, in some aspects, the system 100 may include one or more video capture devices 106(1)-(N), a monitoring platform 108, a plurality of monitoring devices 110(1)-(*n*), and a communication network 112. Further, the video capture device 106, the monitoring platform 108, and the plurality of monitoring devices 110(1)-(*n*) may communicate via the communication network 112. In some implementations, the communication network 112 may include one or more of a wired and/or wireless private network, personal area network, local area network, wide area network, or the Internet.

In some aspects, the video capture devices 106(1)-(N) may be configured to capture video frames 114(1)-(N) of activity within the monitored area 102. For instance, the video capture device 106(1) may capture activity of the persons 116(1)-(N) within the monitored area 102 to be processed and/or displayed by the monitoring platform 108 and the monitoring devices 110. As used herein, in some aspects, a "privacy area" refers to a specific region or location within the field of view of a video capture device 106 where sensitive or confidential information is present or activities requiring privacy protection take place. Examples of privacy areas 104(1)-(*n*) include ATM keypads and screens, windows of private residences or offices, entrances to secure facilities, or areas where individuals may have an expectation of privacy. Furthermore, privacy zones are implemented to obscure the privacy areas 104(1)-(*n*) as captured within the video frames 114, thereby ensuring that sensitive information remains secure and inaccessible to unauthorized individuals while maintaining the overall effectiveness of the surveillance system for safety and security purposes.

As illustrated in FIG. 1, the video capture device 106 may include a privacy zone generation component 118, an object detection component 120, an object tracking component 122, an intersection detection component 124, and a privacy zone enforcement component 126.

The privacy zone generation component 118 of a particular video capture device 106 defines and manages the privacy zones 128(1)-(*n*) applied to activity within the privacy areas 104(1)-(*n*) as captured within the field of view of the particular video capture device 106. In some aspects, the privacy zone generation component 118 receives and manages privacy zone parameters defining the dimensions and positions of the privacy zones 128(1)-(*n*). For example, the privacy zone generation component 118 receives and stores at least one of a privacy location coordinate, a privacy zone length, a privacy zone width, and a privacy zone depth defining a privacy zone 128 for the video capture device 106 and a particular privacy area 104. Further, the privacy zone generation component 118 may resize or reposition the privacy zones 128(1)-(*n*) as needed, ensuring precise coverage of a designated privacy area 104. In some aspects, the privacy zone generation component 118 presents a graphical user interface (GUI) on the video capture device or a remote device (e.g., the monitoring platform 108 and/or the monitoring devices 110) for entering privacy zone parameters. For example, the privacy zone generation component 118 may present a GUI for drawing, resizing, and/or repositioning privacy zones 128(1)-(*n*). Further, the privacy zone generation component 118 may present a GUI for confirming that a privacy zone 128 properly masks a privacy area 104.

The object detection component 120 may be configured to detect objects (e.g., the persons 116(1)-(N)) within the video frames 114(1)-(N), and generate object detection information 130 corresponding to the objects detected within the video frames 114(1)-(N). In some aspects, the object detection component 120 may employ one or more machine learning techniques (e.g., image segmentation) and/or one or more machine learning models (e.g., a convolution neural network) to determine the object detection information 130 based on the video frames 114(1)-(N). Further, in some aspects, the object detection information 130 may include a bounding representation (e.g., a bounding box), a predicted class, i.e., type of object (e.g., person or article), and confidence score for each of the detected objects. As used herein, in some aspects, the "confidence score" may represent the likelihood that a detected object belongs to the predicted class.

The object tracking component 122 may be configured to generate tracking information 132 indicating the trajectory of the detected objects over the video frames 114(1)-(N) using machine learning models and/or pattern recognition techniques. In particular, the object tracking component 122 may receive at least the bounding representations of the detected objects from the object detection component 120 for each frame 114, and determine if the bounding representations of a current video frame 114 have corresponding bounding representations in one of the preceding video frames 114. In some instances, the object tracking component 122 may employ the predicted class information and confidence score information to determine if a current bounding representation has a corresponding historic bounding representation. Further, the object tracking component 122 may assign object identifiers to the detected objects within the tracking information 132. For instance, if the object tracking component 122 determines that a current bounding representation has a corresponding historic bounding representation, the object tracking component 122 assigns the object identifier of the corresponding historic bounding representation to the current bounding representation. If the object tracking component 122 determines that a current bounding representation does not have a corresponding historic bounding representation in the preceding video frames 114, the object tracking component 122 assigns a new object identifier to the current bounding representation. Further, the object tracking component 122 may generate tracks corresponding to the trajectory of the detected objects across the video frames 114(1)-(N) based on the assigned object identifiers. For example, a track may correspond to a trajectory connecting all of the bounding representations assigned to the same object identifier.

The intersection detection component 124 determines whether a tracked object is within the privacy zone 128. In some aspects, the intersection detection component 124 determines whether a tracked object is within the privacy zone 128 based on the depth and location of the privacy zone 128. For example, in some aspects, the intersection detection component 124 determines whether a tracked object is within the privacy zone 128 by comparing an estimate of the depth of the privacy zone 128 to an estimate of the depth of the tracked object within a video frame 114. For instance, in some aspects, the intersection detection component 124 determines a size of the tracked object within the video frame 114 and a size of the privacy zone within the video frame 114. Further, the intersection detection component 124 determines that the tracked object is within the privacy zone 128 based on the difference between the size of the privacy zone and the size of the tracked object being less than a predefined threshold, and the location of the privacy zone 128 intersecting with at least a portion of the tracked object.

In some aspects, the intersection detection component 124 determines whether a tracked object is within the privacy zone 128 based on comparing the depth and location of the privacy zone 128 and the depth and location of the tracked object. For example, the video capture device 106 may be coupled with one or more depth sensors 134 configured to determine the depth of the tracked object. Some examples of depth sensors 134 may employ at least one of laser pulses (e.g., light detection and radar (LiDAR)), infrared light pulses, ultrasonic sound waves, or structured light 3D scanners to determine the depth of a tracked object. In addition, the intersection detection component 124 may determine whether the depth of the privacy zone is 128 is less than the depth of the tracked object as measured by the depth sensor 134. Further, the intersection detection component 124 may determine whether the location of the privacy zone 128 intersects with the location of at least a portion of the tracked object. Additionally, the intersection detection component 124 determines that the tracked object is within the privacy zone 128 based on the depth of the privacy zone 128 being less than the depth of the tracked object, and the location of the privacy zone 128 intersecting with at least a portion of the tracked object.

As another example, the intersection detection component 124 may employ a monocular depth estimation method to determine whether a tracked object is within the privacy zone 128. For instance, the intersection detection component 124 may employ a neural network configured to employ a monocular depth estimation technique to determine the depth of the tracked object within a video frame 114. In addition, the intersection detection component 124 may determine whether the depth of the privacy zone 128 is less than the depth of the tracked object as measured by the depth sensor 134. Further, the intersection detection component 124 may determine whether the location of the privacy zone 128 intersects with the location of at least a portion of the tracked object. Additionally, the intersection detection component 124 determines that the tracked object is within the privacy zone 128 based on the depth of the privacy zone 128 being less than the depth of the tracked object, and the location of the privacy zone 128 intersecting with at least a portion of the tracked object. As used herein, "monocular depth estimation" may refer to a computer vision technique used to infer the depth information of a scene from a single 2D image. In some aspects, the monocular depth estimation utilizes deep learning algorithms, often based on Convolutional Neural Networks (CNNs), to predict the distances between the camera and various objects within the scene. Further, the output may be a depth map, where each pixel in the input image is assigned a depth value, creating a 3D representation of the scene. Further, the depth of a tracked object may be determined from values of the depth map associated with the boundary representation of the tracked object.

As another example, the intersection detection component 124 may employ stereo vision techniques to determine whether a tracked object is within the privacy zone 128. For instance, the intersection detection component 124 may utilize two video frames 114(1)-(2) to determine the depth of the tracked object within the first video frame 114(1). In some aspects, the two video frames 114(1)-(2) may be captured by different lenses of the video capture device 106 (e.g., the first video frame 114(1) may be captured by a first lens of the video capture device 106 and the second video frame 114(2) may be captured by a second lens of the video capture device 106). In some other aspects, a video frame 114(1) may be captured by the video capture device 106(1) enforcing the privacy zone 128, and another video frame 114(1) may be captured by another video capture device 106(2) and transmitted to the video capture device 106(1). Further, the intersection detection component 124 may determine the depth of the tracked object based upon the positions of the tracked object in each of the video frames 114(1)-(2) via triangulation. In addition, the intersection detection component 124 may determine whether the depth of the privacy zone is 128 is less than the depth of the tracked object as measured by the depth sensor 134. Further, the intersection detection component 124 may determine whether the location of the privacy zone 128 intersects with the location of at least a portion of the tracked object. Additionally, the intersection detection component 124 determines that the tracked object is within the privacy zone 128 based on the depth of the privacy zone 128 being less than the depth of the tracked object, and the location of the privacy zone 128 intersecting with at least a portion of the tracked object.

By employing determining the relationship between the depth and location of tracked objects and privacy zones within the video frames 114(1)-(*n*), the intersection detection component 124 ensures that privacy zones 128(1)-(*n*) are effectively applied, thereby protecting sensitive information without compromising the overall effectiveness of the surveillance system.

The privacy zone enforcement component 126 obscures tracked objects that are within a privacy zone (i.e., having a same location and depth equal to or greater than the privacy zone). For example, the privacy zone enforcement component 126 receives initial video capture information 136 and obscures one or more tracked objects determined to be within the privacy zones 128(1)-(*n*) by the intersection detection component 124 to generate final video capture information 138. In some aspects, the privacy zone enforcement component 126 generates a mask 140 and combines the mask with a video frame to implement the privacy zones 128(1)-(*n*). In some aspects, the location of a tracked object as determined by the object detection component 120 determines the shape of the mask 140. For example, if the tracked object is within a privacy zone 128, the mask 140 will be generated with an obscuring effect (e.g., a black box, pixelization, etc.) over the shape of the tracked object as determined by the object detection component 120 via an objected segmentation process.

Further, the tracked objects that are determined not to be positioned with a privacy zone 128(1)-(*n*) are presented within the final video capture information 138, while the tracked objects that are determined to be positioned with a privacy zone 128(1)-(*n*) are permanently obscured within the final video capture information 138. Further, as each video frame 114 is captured by the video capture device 106, the intersection detection component 124 determines a new intersection status of each of the tracked objects with respect to the privacy zones 128(1)-(*n*) and determines whether to obscure a tracked object based upon the new status of the tracked object.

As illustrated in FIG. 1, in some aspects, the monitoring platform 108 may include the privacy zone generation component 118, the object detection component 120, the object tracking component 122, the intersection detection component 124, and the privacy zone enforcement component 126, and/or a monitoring device 110 may include the privacy zone generation component 118, the object detection component 120, the object tracking component 122, the intersection detection component 124, and the privacy zone enforcement component 126. For example, a video capture device 106 may capture the initial video capture information 136 and transmit the initial video capture information 136 to the monitoring platform 108. Upon receipt of the initial video capture information 136, the monitoring platform 108 may employ the object detection component 120, the object tracking component 122, the intersection detection component 124, and the privacy zone enforcement component 126 to generate the final video capture information 138, and transmit the final video capture information 138 to the plurality of monitoring devices 110 for viewing by monitoring personnel. As another example, a video capture device 106 may capture the initial video capture information 136 and transmit the initial video capture information 136 to a monitoring device 110. Upon receipt of the initial video capture information 136, the monitoring device 110 may employ the object detection component 120, the object tracking component 122, the intersection detection component 124, and the privacy zone enforcement component 126 to generate the final video capture information 138, and present the final video capture information 138 to monitoring personnel via a presentation component 142.

Figure 2A:
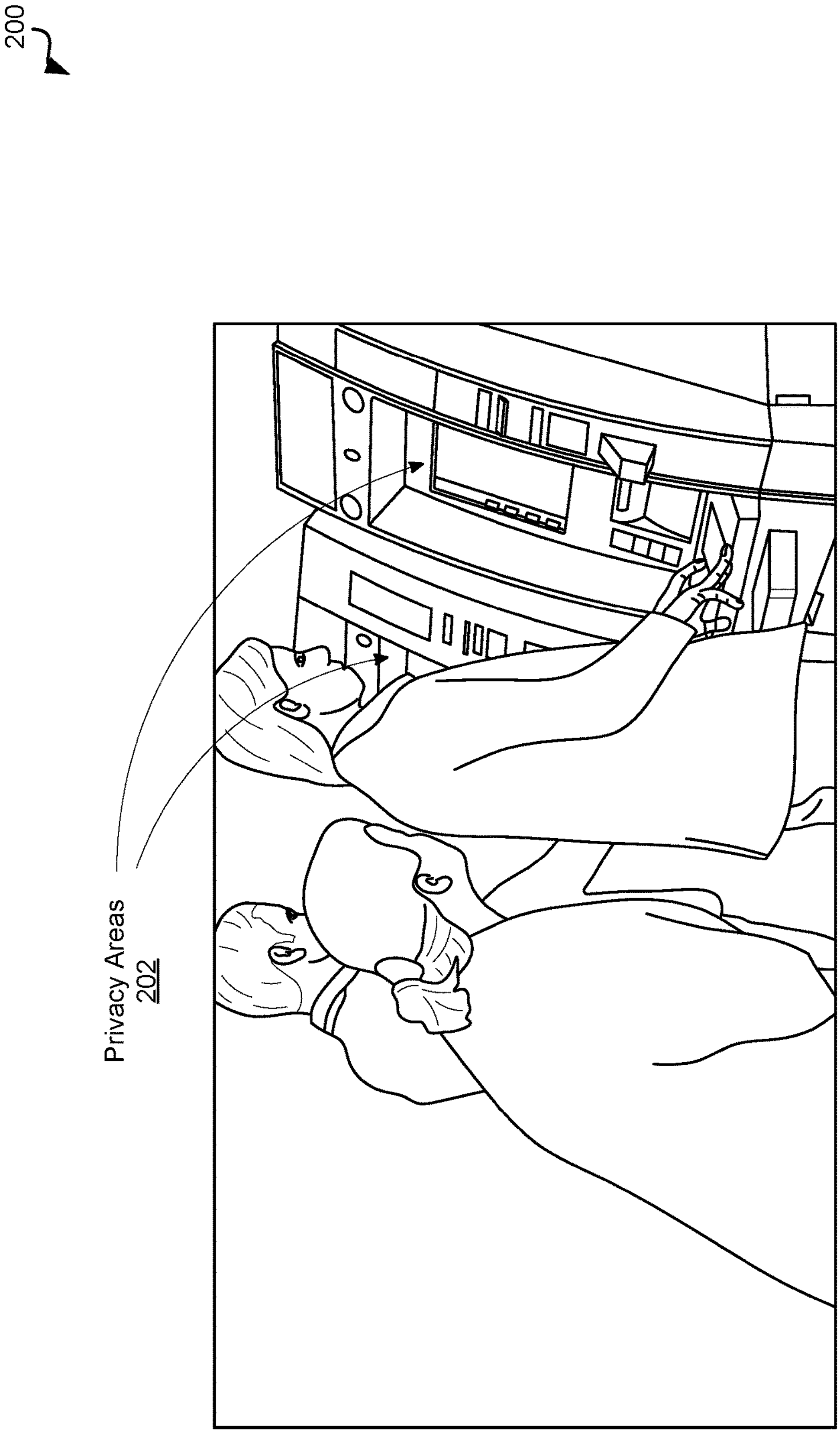
FIG. 2A is a diagram illustrating an example privacy area, in accordance with some aspects of the present disclosure.

In some aspects, the presentation component 142 may be configured to display the final video capture information 138 within a graphical user interface (GUI). For example, the presentation component 142 may be configured to cause display of the final video capture information 138 within a GUI on a display of a client device of the monitoring device 110. FIG. 2A is a diagram illustrating an example privacy area, in accordance with some aspects of the present disclosure. As illustrated in FIG. 1, a physical space may include a plurality of privacy areas 202(1)-(*n*). As described above, in some aspects, "a privacy area" refers to a specific region or location where sensitive or confidential information is present or activities requiring privacy protection take place. Further, a privacy area may refer to a wide range of spaces, domains, or contexts where individuals or entities have a legitimate expectation of confidentiality and protection of personal or sensitive information. Some examples of privacy areas include areas surrounding Automated Teller Machines (ATMs), private properties, and changing rooms. Additionally, privacy areas may result from compliance with privacy regulations pertaining to video surveillance such as portions of the General Data Protection Regulation (GDPR) and the California Consumer Privacy Act (CCPA).

Furthermore, privacy areas also include areas where particular processes are performed and areas associated with specific categories of information, such as personally identifiable information, trade secrets, and sensitive information. The concept of privacy areas highlights the importance of respecting individuals' rights to privacy and ensuring the security of confidential information in various settings.

Figure 2B:
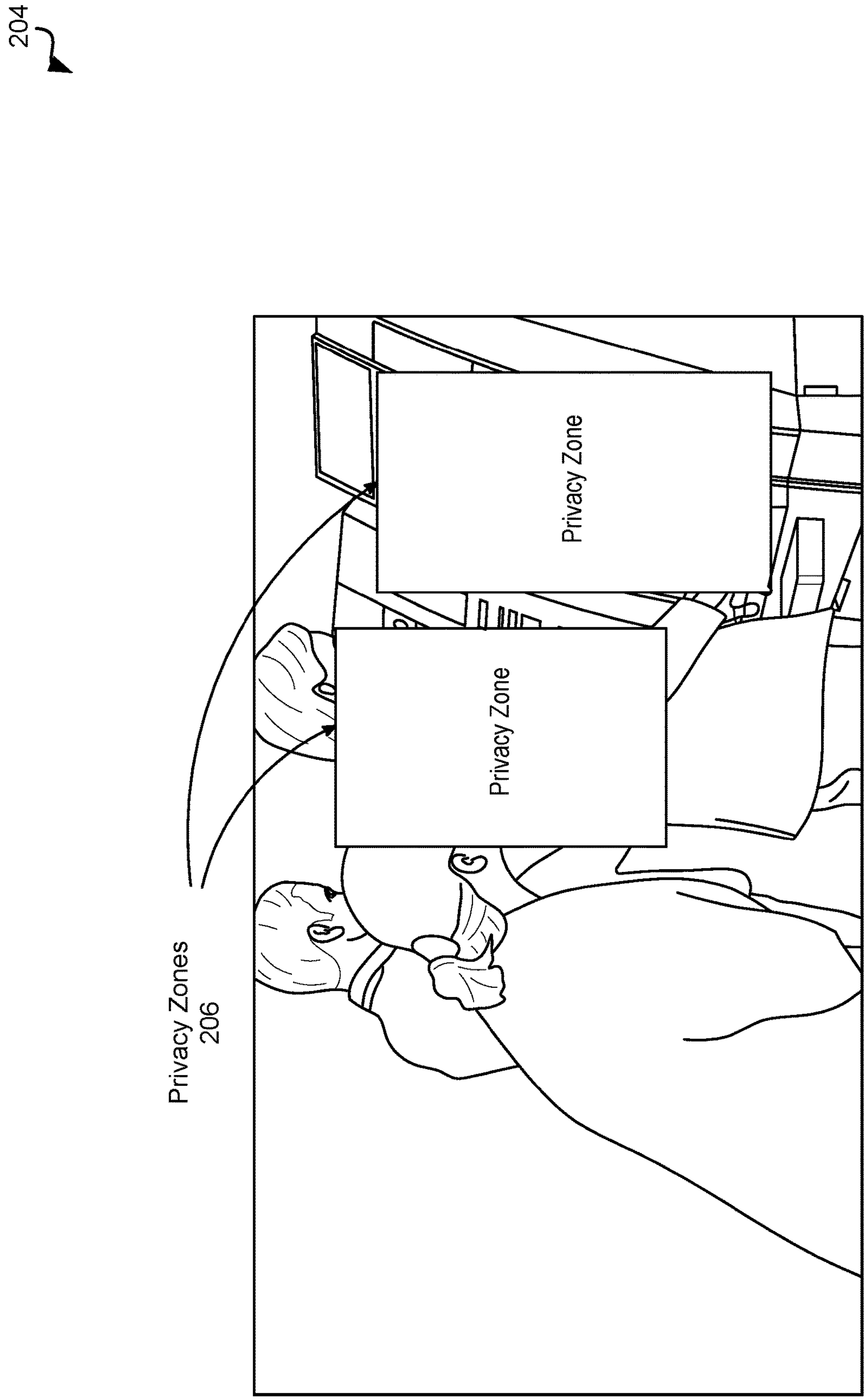
FIG. 2B is a diagram illustrating an example privacy zone.

FIG. 2B is a diagram illustrating an example privacy zone, in accordance with some aspects of the present disclosure. As illustrated in FIG. 2B, video capture information 204 may be presented with privacy zones 206 that obscure privacy areas 202 within a field of view of the video capture device that captured the privacy areas 202. As illustrated in FIG. 2B, privacy zones 206 may lack the concept of depth and unintentionally obscure important video image data.

Figure 2C:
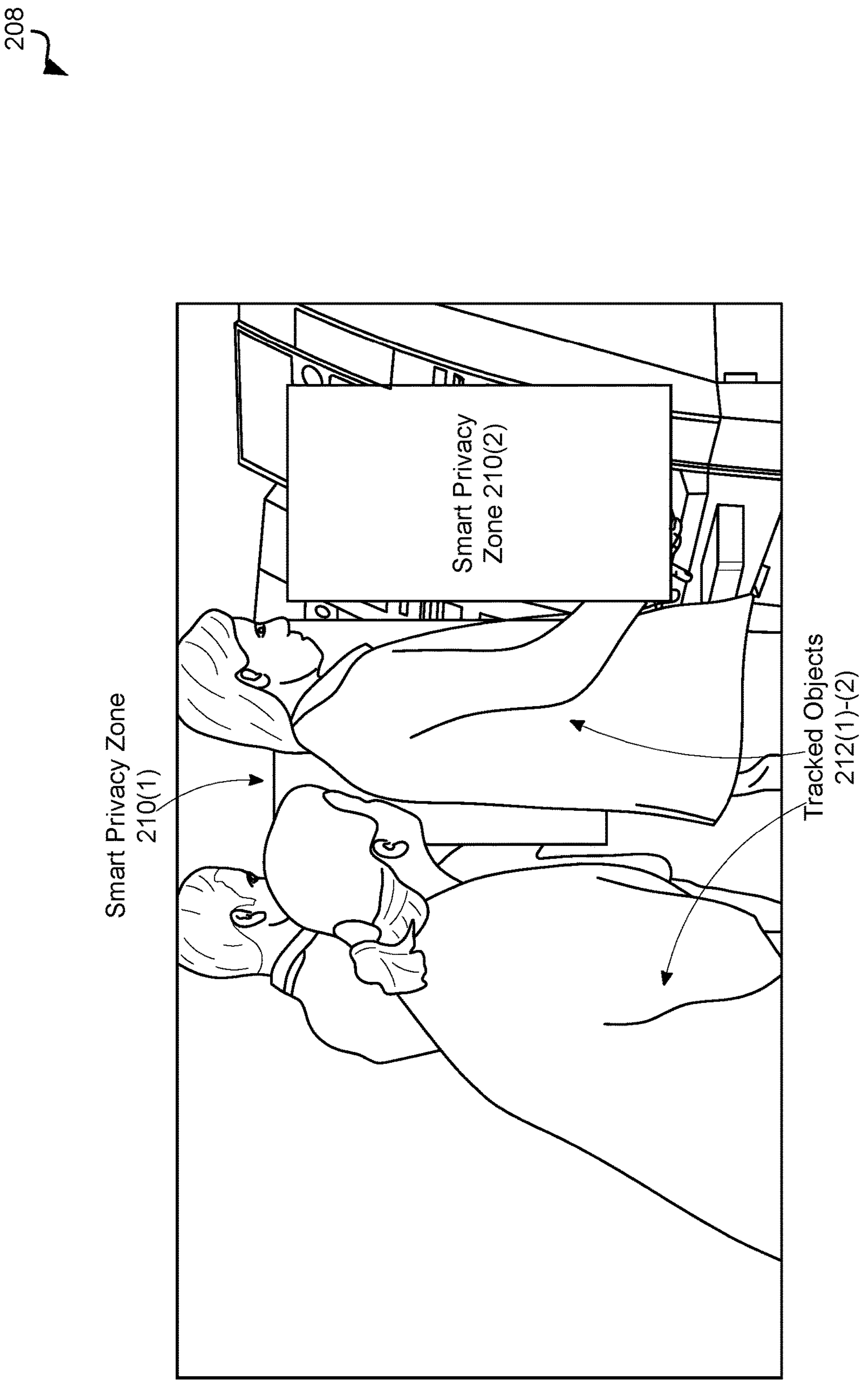
FIG. 2C is a diagram illustrating an example smart privacy zone, in accordance with some aspects of the present disclosure.

FIG. 2C is a diagram illustrating an example smart privacy zone, in accordance with some aspects of the present disclosure. As illustrated in FIG. 2C, video capture information 208 may be presented with smart privacy zones 210 that obscure privacy areas 202 within a field of view of the video capture device that captured the privacy areas 202. As illustrated in FIG. 2C, smart privacy zones 210 may account for the depth of tracked objects 212 and only obscure tracked objects when they fall within the smart privacy zones 210, instead of obscuring the tracked objects as illustrated in FIG. 2B where depth is not considered by the privacy zones 206.

Figure 3:
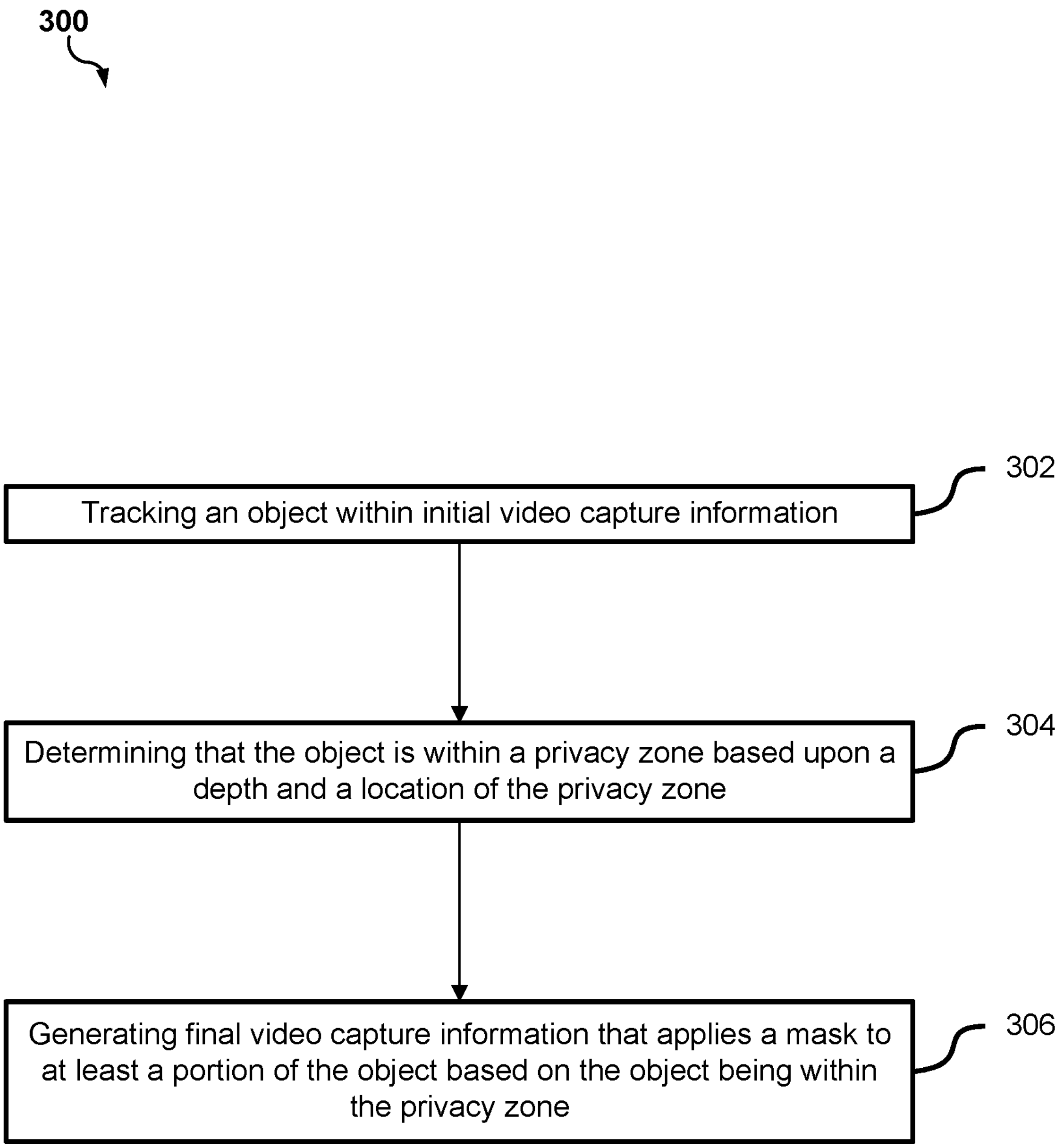
FIG. 3 is a flow diagram illustrating an example method for unified query optimization for scale-out query processing, in accordance with some aspects of the present disclosure.

Referring to FIG. 3, in operation, the system 100 or computing device 400 may perform an example method 300 for providing natural language search over security videos. The method 300 may be performed by one or more components of the system 100 (e.g., the privacy zone generation component 118, the object detection component 120, the object tracking component 122, the intersection detection component 124, the privacy zone enforcement component 126, and the presentation component 142), the computing device 400, or any device/component described herein according to the techniques described with reference to FIGS. 1-2 and 4.

At block 302, the method 300 includes tracking an object within initial video capture information. For example, the object detection component 120 and the object tracking component 122 may be employed to detect and track an object over one or more video frames 114 (i.e., the video capture information). Accordingly, the video capture device 106, the monitoring platform 108, the monitoring device 110, the computing device 400, and/or the processor 402 executing the object detection component 120 and/or the object tracking component 122 may provide means for tracking an object within initial video capture information.

At block 304, the method 300 includes determining that the object is not within a privacy zone based upon a depth of the privacy zone. For example, the intersection detection component 124 may determine that size of an object is larger than the size of privacy zone, and estimate that the depth of privacy zone is greater than the depth of the object based upon the size relationship. Accordingly, the video capture device 106, the monitoring platform 108, the monitoring device 110, the computing device 400, and/or the processor 402 executing the intersection detection component 124 may provide means for determining that the object is not within a privacy zone based upon a depth of the privacy zone.

At block 306, the method 300 includes generating final video capture information that does not apply a mask to at least a portion of the object based on the object not being within the privacy zone. For example, the privacy zone enforcement component 126 may not apply a mask to obscure the tracked object even though the tracked object has a similar location or position to the privacy zone based upon the depth of privacy zone being greater than the depth of the object. In addition, the privacy zone enforcement component 126 may apply the mask to obscure other tracked object based upon the other tracked objects having a depth equal to or greater than the privacy zone. Accordingly, the video capture device 106, the monitoring platform 108, the monitoring device 110, the computing device 400, and/or the processor 402 executing the privacy zone enforcement component 126 may provide means for generating final video capture information that does not apply a mask to at least a portion of the object based on the object not being within the privacy zone.

In an alternative or additional aspect, in order to determine that the object is not within a privacy zone based upon a depth of the privacy zone, the method 300 comprises determining a first size of the object within the initial video capture information, determining a second size of the privacy zone within the initial video capture information, identifying a relationship between the depth of the privacy zone and a depth of the object based on a difference between the first size and the second size being less than a predefined threshold, and determining that the object is within the privacy zone based upon the relationship. Accordingly, the video capture device 106, the monitoring platform 108, the monitoring device 110, the computing device 400, and/or the processor 402 executing the intersection detection component 124 may provide means for determining a first size of the object within the initial video capture information, determining a second size of the privacy zone within the initial video capture information, identifying a relationship between the depth of the privacy zone and a depth of the object based on a difference between the first size and the second size being less than a predefined threshold, and determining that the object is within the privacy zone based upon the relationship.

In an alternative or additional aspect, in order to determine that the object is not within a privacy zone based upon a depth of the privacy zone, the method 300 comprises determining a depth and a location of the object within the initial video capture information, and comparing the depth and the location of the object to the depth and the location of the privacy zone to identify that the object is not within the privacy zone. Accordingly, the video capture device 106, the monitoring platform 108, the monitoring device 110, the computing device 400, and/or the processor 402 executing the intersection detection component 124 may provide means for determining a depth and a location of the object within the initial video capture information, and comparing the depth and the location of the object to the depth and the location of the privacy zone to identify that the object is not within the privacy zone.

In an alternative or additional aspect, in order to determine that the object is not within a privacy zone based upon a depth of the privacy zone, the method 300 comprises determining the depth of the object via depth sensor of a video capture device that captures the initial video capture information. Accordingly, the video capture device 106, the monitoring platform 108, the monitoring device 110, the computing device 400, and/or the processor 402 executing the intersection detection component 124 may provide means for determining the depth of the object via depth sensor of a video capture device that captures the initial video capture information.

In an alternative or additional aspect, in order to track the object within the initial video capture information, the method 300 comprises determining, via monocular depth estimation, the depth of the object based upon the initial video capture information. Accordingly, the video capture device 106, the monitoring platform 108, the monitoring device 110, the computing device 400, and/or the processor 402 executing the intersection detection component 124 may provide means for determining, via monocular depth estimation, the depth of the object based upon the initial video capture information.

In an alternative or additional aspect, wherein the initial video capture information is first initial video capture information, and in order to determine that the object is not within a privacy zone based upon a depth of the privacy zone, the method 300 comprises determining first object information of the object within the first initial video capture information, determining second object information of the object within second initial video capture information, and determining, via a triangulation process, the depth of the object based upon the first object information and the second object information. Accordingly, the video capture device 106, the monitoring platform 108, the monitoring device 110, the computing device 400, and/or the processor 402 executing the intersection detection component 124 may provide means for determining first object information of the object within the first initial video capture information, determining second object information of the object within second initial video capture information, and determining, via a triangulation process, the depth of the object based upon the first object information and the second object information.

In an alternative or additional aspect, the method 300 comprises tracking the object within the initial video capture information comprises tracking the object via a segmentation object classifier to generate an object segment, and generating final video capture information comprises generating the final video capture information by applying the mask to the object segment. Accordingly, the video capture device 106, the computing device 400, and/or the processor 402 may provide means for tracking the object via a segmentation object classifier to generate an object segment, and generating the final video capture information by applying the mask to the object segment.

In an alternative or additional aspect, the method 300 comprises capturing the initial video capture information and transmitting the final video capture information to a monitoring platform or a monitoring device. Accordingly, the video capture device 106, the computing device 400, and/or the processor 402 may provide means for capturing the initial video capture information and transmitting the final video capture information to a monitoring platform or a monitoring device.

In an alternative or additional aspect, the method 300 comprises receiving drawing input defining the privacy zone via a graphical user interface. Accordingly, the video capture device 106, the monitoring platform 108, the monitoring device 110, the computing device 400, and/or the processor 402 executing the privacy zone generation component 118 may provide means for receiving drawing input defining the privacy zone via a graphical user interface.

In an alternative or additional aspect, the method 300 comprises receiving a privacy location coordinate, a privacy zone length, a privacy zone width, and a privacy zone depth defining the privacy zone. Accordingly, the video capture device 106, the monitoring platform 108, the monitoring device 110, the computing device 400, and/or the processor 402 executing the privacy zone generation component 118 may provide means for receiving a privacy location coordinate, a privacy zone length, a privacy zone width, and a privacy zone depth defining the privacy zone.

Figure 4:
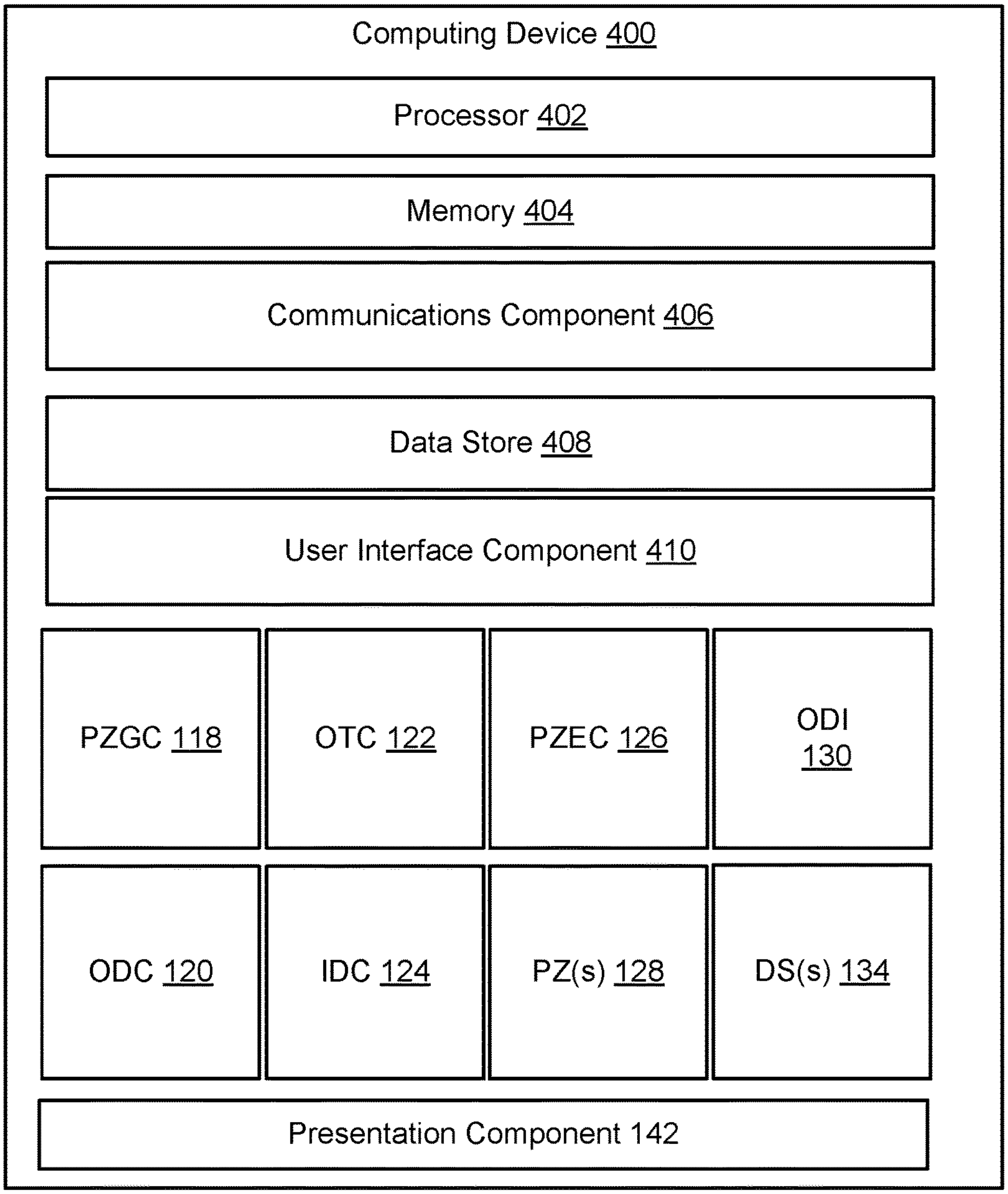
FIG. 4 is a block diagram illustrating an example of a hardware implementation for a computing device(s), in accordance with some aspects of the present disclosure.

Referring to FIG. 4, a computing device 400 may implement all or a portion of the functionality described herein. The computing device 400 may be or may include or may be configured to implement the functionality of at least a portion of the system 100, or any component therein. For example, the computing device 400 may be or may include or may be configured to implement the privacy zone generation component 118, the object detection component 120, the object tracking component 122, the intersection detection component 124, the privacy zone enforcement component 126, and the presentation component 142. The computing device 400 includes a processor 402 which may be configured to execute or implement software, hardware, and/or firmware modules that perform any functionality described herein. For example, the processor 402 may be configured to execute or implement software, hardware, and/or firmware modules that perform any functionality described herein with reference to the privacy zone generation component 118, the object detection component 120, the object tracking component 122, the intersection detection component 124, the privacy zone enforcement component 126, and the presentation component 142, or any other component/system/device described herein.

The processor 402 may be a micro-controller, an application-specific integrated circuit (ASIC), a digital signal processor (DSP), or a field-programmable gate array (FPGA), and/or may include a single or multiple set of processors or multi-core processors. Moreover, the processor 402 may be implemented as an integrated processing system and/or a distributed processing system. The computing device 400 may further include a memory 404, such as for storing local versions of applications being executed by the processor 402, related instructions, parameters, etc. The memory 404 may include a type of memory usable by a computer, such as random-access memory (RAM), read only memory (ROM), tapes, magnetic discs, optical discs, volatile memory, non-volatile memory, and any combination thereof. Additionally, the processor 402 and the memory 404 may include and execute an operating system executing on the processor 402, one or more applications, display drivers, etc., and/or other components of the computing device 400.

Further, the computing device 400 may include a communications component 406 that provides for establishing and maintaining communications with one or more other devices, parties, entities, etc. utilizing hardware, software, and services. The communications component 406 may carry communications between components on the computing device 400, as well as between the computing device 400 and external devices, such as devices located across a communications network and/or devices serially or locally connected to the computing device 400. In an aspect, for example, the communications component 406 may include one or more buses, and may further include transmit chain components and receive chain components associated with a wireless or wired transmitter and receiver, respectively, operable for interfacing with external devices.

Additionally, the computing device 400 may include a data store 408, which can be any suitable combination of hardware and/or software, that provides for mass storage of information, databases, and programs. For example, the data store 408 may be or may include a data repository for applications and/or related parameters not currently being executed by processor 402. In addition, the data store 408 may be a data repository for an operating system, application, display driver, etc., executing on the processor 402, and/or one or more other components of the computing device 400.

The computing device 400 may also include a user interface component 410 operable to receive inputs from a user of the computing device 400 and further operable to generate outputs for presentation to the user (e.g., via a display interface to a display device). The user interface component 410 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 410 may include one or more output devices, including but not limited to a display interface, a speaker, a haptic feedback mechanism, a printer, any other mechanism capable of presenting an output to a user, or any combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:

tracking an object within initial video capture information of a monitored area, wherein the object has a first depth;

determining whether the object is within or not within a privacy zone of the monitored area based upon comparing a second depth of the privacy zone to the first depth of the object, wherein the object is within the privacy zone based at least in part on the second depth of the privacy zone being less than the first depth of the object; and generating final video capture information by selectively applying or not applying a mask to at least a portion of the object based on the object being within or not being within the privacy zone, respectively.

2. The method of claim 1, wherein determining whether the object is within or not within the privacy zone based upon the second depth of the privacy zone further comprises:

determining a first size of the object within the initial video capture information;

determining a second size of the privacy zone within the initial video capture information;

identifying a relationship between the second depth of the privacy zone and the first depth of the object based on a difference between the first size and the second size being less than a predefined threshold; and determining that the object is within the privacy zone based upon the relationship.

3. The method of claim 1, wherein determining whether the object is within or not within the privacy zone based upon the second depth of the privacy zone, comprises:

determining the first depth and a first location of the object within the initial video capture information; and comparing the first depth and the first location of the object to the second depth and a second location of the privacy zone to identify that the object is not within the privacy zone.

4. The method of claim 3, wherein determining the first depth and the first location of the object within the initial video capture information, comprises:

determining the first depth of the object via depth sensor of a video capture device that captures the initial video capture information.

5. The method of claim 3, wherein determining the first depth and the first location of the object within the initial video capture information, comprises:

determining, via monocular depth estimation, the first depth of the object based upon the initial video capture information.

6. The method of claim 3, wherein the initial video capture information is first initial video capture information, and determining the first depth and the first location of the object within the initial video capture information, comprises:

determining first object information of the object within the first initial video capture information;

determining second object information of the object within second initial video capture information; and determining, via a triangulation process, the first depth of the object based upon the first object information and the second object information.

7. The method of claim 1, wherein tracking the object within the initial video capture information comprises:

tracking the object via a segmentation object classifier to generate an object segment; and generating the final video capture information by applying the mask to the object segment.

8. The method of claim 1, further comprising:

capturing the initial video capture information; and transmitting the final video capture information to an image processing device or a presentation device.

9. The method of claim 1, further comprising receiving drawing input defining the privacy zone via a graphical user interface.

10. The method of claim 1, further comprising receiving a privacy location coordinate, a privacy zone length, a privacy zone width, and a privacy zone depth defining the privacy zone.

11. A system for managing privacy zones in video surveillance, comprising:

one or more memories storing instructions; and one or more processors communicatively coupled with the one or more memories and configured to execute the instructions to:

track an object within initial video capture information of a monitored area, wherein the object has a first depth;

determine whether the object is within or not within a privacy zone of the monitored area based upon comparing a second depth of the privacy zone to the first depth of the object, wherein the object is within the privacy zone based at least in part on the second depth of the privacy zone being less than the first depth of the object; and generate final video capture information by selectively applying or not applying a mask to at least a portion of the object based on the object being within or not being within the privacy zone, respectively.

12. The system of claim 11, wherein to track the object within the initial video capture information, the one or more processors are configured to track the object via a segmentation object classifier to generate an object segment, and wherein to generate the final video capture information, the one or more processors are configured to generate the final video capture information by applying the mask to the object segment.

13. The system of claim 11, wherein to determine whether the object is within or not within the privacy zone based upon the second depth of the privacy zone, the one or more processors are configured to:

determine a first size of the object within the initial video capture information;

determine a second size of the privacy zone within the initial video capture information;

identify a relationship between the second depth of the privacy zone and the first depth of the object based on a difference between the first size and the second size being less than a predefined threshold; and determine that the object is within the privacy zone based upon the relationship.

14. The system of claim 11, wherein to determine whether the object is within or not within the privacy zone based upon the second depth of the privacy zone, the one or more processors are configured to:

determine the first depth and a first location of the object within the initial video capture information; and compare the first depth and the first location of the object to the second depth and a second location of the privacy zone to identify that the object is not within the privacy zone.

15. The system of claim 13, wherein to determine whether the object is within or not within the privacy zone based upon the second depth of the privacy zone, the one or more processors are configured to:

determine the first depth of the object via depth sensor of a video capture device that captures the initial video capture information.

16. The system of claim 13, wherein to determine whether the object is within or not within the privacy zone based upon the second depth of the privacy zone, the one or more processors are configured to:

determine, via monocular depth estimation, the first depth of the object based upon the initial video capture information.

17. The system of claim 13, wherein the initial video capture information is first initial video capture information, and to determine that the object is not within the privacy zone based upon the second depth of the privacy zone, the one or more processors are configured to:

determine first object information of the object within the first initial video capture information;

determine second object information of the object within second initial video capture information; and determine, via a triangulation process, the first depth of the object based upon the first object information and the second object information.

18. A non-transitory computer-readable device storing instructions thereon that, when executed by at least one computing device, causes the at least one computing device to perform operations comprising:

tracking an object within initial video capture information of a monitored area, wherein the object has a first depth;

determining whether the object is within or not within a privacy zone of the monitored area based upon comparing a second depth of the privacy zone to the first depth of the object, wherein the object is within the privacy zone based at least in part on the second depth of the privacy zone being less than the first depth of the object; and generate final video capture information by selectively applying or not applying a mask to at least a portion of the object based on the object being within or not being within the privacy zone, respectively.

19. The non-transitory computer-readable device of claim 18, wherein determining whether the object is within or not within the privacy zone based upon the second depth of the privacy zone, comprises:

determining the first depth and a first location of the object within the initial video capture information; and comparing the first depth and the first location of the object to the second depth and a second location of the privacy zone to identify that the object is not within the privacy zone.

20. The non-transitory computer-readable device of claim 18, wherein tracking the object within the initial video capture information comprises:

tracking the object via a segmentation object classifier to generate an object segment; and generating the final video capture information by applying the mask to the object segment.

21. The method of claim 1, wherein determining whether the object is within or not within the privacy zone based upon the second depth of the privacy zone comprises comparing a second estimate of the second depth of the privacy zone to a first estimate of the first depth of the object within a video frame.

22. The method of claim 1, further comprising determining whether the object is within or not within the privacy zone based on a difference between a second size of the privacy zone and a first size of the object being not less than a predefined threshold, and a second location of the privacy zone not intersecting with at least the portion of the object.

23. The method of claim 1, wherein the privacy zone comprises two or more privacy zones.

24. The method of claim 23, wherein at least two of the two or more privacy zones do not overlap.

25. The method of claim 23, wherein a portion of at least one of the two or more privacy zones is closer to a camera than at least the portion of the object.

26. The method of claim 1, wherein a first location of the object determines a shape of the mask.

27. The method of claim 1, further comprising:

receiving privacy zone information defining a location and the second depth of a privacy zone area of the privacy zone; and wherein a first location of the object intersects with a second location of the privacy zone, wherein generating the final video capture information comprises applying the mask to at least the portion of the object based on the privacy zone having the second depth less than the first depth of the object and having the first location of the object intersect with the second location of the privacy zone.

* * * * *